(12) United States Patent
Wang et al.

(10) Patent No.: US 8,478,092 B2
(45) Date of Patent: Jul. 2, 2013

(54) IN-LINE SINGLE FIBER MACH-ZEHNDER INTERFEROMETER

(75) Inventors: Dongning Wang, Hong Kong (HK); Ying Wang, Hong Kong (HK); Minwei Yang, Hong Kong (HK)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 786 days.

(21) Appl. No.: 12/610,375

(22) Filed: Nov. 2, 2009

(65) Prior Publication Data

US 2011/0102803 A1  May 5, 2011

(51) Int. Cl.
*G02B 6/26* (2006.01)
*G02B 6/00* (2006.01)

(52) U.S. Cl.
USPC ............................................. 385/39; 385/12

(58) Field of Classification Search
None
See application file for complete search history.

(56) References Cited

U.S. PATENT DOCUMENTS

| | | | |
|---|---|---|---|
| 6,862,386 B2 | 3/2005 | Corio et al. | |
| 6,900,898 B2 | 5/2005 | Ahmadvand et al. | |
| 7,209,605 B2 * | 4/2007 | Cantin et al. | 385/12 |
| 2009/0052852 A1 | 2/2009 | Minkovich et al. | |

OTHER PUBLICATIONS

Hae Young Choi, Myoung Jin Kim, and Byeong Ha Lee "All-fiber Mach-Zehnder type interferometers formed in photonic crystal fiber", Optics Express 5711, vol. 15, No. 9, Apr. 30, 2007.

Gregor Weihs, Michael Reck, Harald Weinfurter, and Anton Zeilinger "All-fiber three-path Mach-Zehnder interferometer", Optics Letters, vol. 21, No. 4, Feb. 15, 1996.

J. Li and P.R. Herman "F2-laser micromachining of fibre-tipped Mach-Zehnder interferometer", Electronics Letters, vol. 42, No. 10, May 11, 2006.

Minkyu Park, Sejin Lee, Woosung Ha, Dae-Kyu Kim, Woojin Shin, Ik-Bu Sohn and Kyunghwan Oh "Fabrication of Intrinsic Fiber Mach-Zehnder Interferometer by Imbedding Micro Air-cavity", Optical Society of America (2009).

X. Yu, P. Shum and X. Dong "Photonic-Crystal-Fiber-Based Mach-Zehnder Interferometer Using Long-Period Gratings", Microwave and Optical Technology Letters, vol. 48, No. 7, Jul. 2006.

Y. Jung, H.Y. Choi, M.J. Kim, B.H. Lee and K. Oh "Ultra-compact Mach-Zehnder interferometer using hollow optical fiber for high temperature sensing", Optical Society of America (2007).

Yongmin Jung, Seijin Lee, Byeong Ha Lee, and Kyunghwan Oh "Ultracompact in-line broadband Mach-Zehnder interferometer using a composite leaky hollow-optical-fiber waveguide", Optics Letters, vol. 33, No. 24, Dec. 15, 2008.

Tao Wei, Yukun Han, Hai-Lung Tsai, and Hai Xiao "Miniaturized fiber inline Fabry-Perot interferometer fabricated with a femtosecond laser", Optics Letters, vol. 33, No. 6, Mar. 15, 2008.

(Continued)

*Primary Examiner* — Sarah Hahm (74) *Attorney, Agent, or Firm* — The Hong Kong Polytechnic University (57) ABSTRACT

A single fiber Mach-Zehnder interferometer comprises an optical fiber having a core region and a cladding surrounding the core region, and a micro-cavity having part of the cladding and the core region removed, wherein the micro-cavity is adapted to receive a light beam and separate the light beam into a first light beam that propagates through the micro-cavity in an unguided mode, and a second light beam that propagates through the core region in a guided mode.

9 Claims, 6 Drawing Sheets

OTHER PUBLICATIONS

Tao Wei, Yukun Han, Yanjun Li, Hai-Lung Tsai, and Hai Xiao "Temperature-insensitive miniaturized fiber inline Fabry-Perot interferometer for highly sensitive refractive index measurement", Optical Society of America (2008).

P. Schiebener et al. "Refractive Index of Water and Steam as Function of Wavelength, Temperature and Density", J. Phys. Chem. Ref. Data, vol. 19, No. 3, 1990.

Byeong Ha Lee and Junji Nishii "Dependence of fringe spacing on the grating separation in a long-period fiber grating pair", Applied Optics, Vo. 38, No. 16, Jun. 1, 1999.

Jong H. Lim, Hyun S. Jang, and Kyung S. Lee "Mach-Zehnder interferometer formed in a photonic crystal fiber based on a pair of long-period fiber gratings", Optical Society of America 2004.

Joel Villatoro, Vladimir P. Minkovich, and David Monzon-Hernandez "Compact Modal Interferometer Built With Tapered Microstructured Optical Fiber", IEEE Photonics Technology Letters, vol. 18, No. 11, Jun. 1, 2006.

Vladimir P. Minkovich, Joel Villatoro, David Monzon-Hernandez, Sergio Calixto, Alexander B. Sotsky, and Ludmila I. Sotskaya "Holey fiber tapers with resonance transmission for high-resolution refractive index sensing", Optics Express 7609, vol. 13, No. 19, Sep. 19, 2005.

Zhaobing Tian, Scott S.-H. Yam, Jack Barnes, Wojtek Bock, Patricia Greig James M. Fraser, Hans-Peter Loock, and Richard D. Oleschuk "Refractive Index Sensing With Mach-Zehnder Interferometer Based on Concatenating Two Single-Mode Fiber Tapers", IEEE Photonics Technology Letters, vol. 20, No. 8, Apr. 15, 2008.

Ping Lu, Liqiu Men, Kevin Sooley and Qiying Chen "Tapered fiber Mach-Zehnder interferometer for simultaneous measurement of refractive index and temperature", Applied Physics Letters 94, 131110 (2009).

Yun-Jiang Rao, Ming Deng, De-Wen Duan, Xiao-Chen Yang, Tao Zhu, Guang-Hua Cheng "Micro Fabry-Perot interferometers in silica fibers machined by femtosecond laser", Optics Express 14123, vol. 15, No. 21, Oct. 17, 2007.

\* cited by examiner

IN-LINE SINGLE FIBER MACH-ZEHNDER INTERFEROMETER

BACKGROUND OF THE INVENTION

1. Field of the Invention

The present invention relates to Mach-Zehnder interferometer and method of making the same, more particularly, to single fiber Mach-Zehnder interferometer.

2. Description of the Related Art

Fiber in-line Mach-Zehnder interferometer (MZI) has various applications in optical fibers communication and optical fiber sensors. Various types of optical fiber in-line MZI structures have been developed, such as long period fiber grating (LPFG) and fiber with a tapered structure. LPFG includes structure with properties periodically varying along the fiber for guiding light from a guided mode to a cladding mode. The structure and the fabrication process for these devices are often complicated. Also, the size of these MZI devices can be relatively large.

Fiber in-line MZI based on interference between the guided modes of the fiber, including single mode fiber (SMF), multimode fiber (MMF) and photonic crystal fiber (PCF), have been used for temperature measurement and refractive index measurement. These devices typically include two cascading fiber components that function as beam splitter and combiner. The former converts part of the core mode power into a forward-propagating cladding mode and the latter recombines the two modes, resulting in a sharp interference. The commonly used "splitters/combiners" include long period gratings (LPGs), tapers, and sections of MMF or PCF.

However, these MZIs have relatively large size, in the order of millimeters or centimeters, and the highest temperature measured is limited to about 1000° C. Furthermore, these MZIs have relatively complex structures. Hence, there exists a need for a compact and simple single fiber MZI for applications such as high temperature and refractive index measurement.

SUMMARY OF THE INVENTION

According to an aspect of the present invention, a single fiber Mach-Zehnder interferometer comprises an optical fiber having a core region and a cladding surrounding the core region, and a micro-cavity having part of the cladding and the core region perpendicularly removed, wherein the micro-cavity is adapted to receive a light beam and separate the light beam into a first light beam that propagates through the micro-cavity in an unguided mode, and a second light beam that propagates through the core region in a guided mode.

According to another aspect of the present invention, a method of making a single fiber Mach-Zehnder interferometer using an optical fiber having a core region and a cladding surrounding the core region, the method comprises creating a micro-cavity on the optical fiber with part of the cladding and the core region removed, wherein the micro-cavity is adapted to receive a light beam and separate the light beam into a first light beam that propagates through the micro-cavity in an unguided mode, and a second light beam that propagates through the core region in a guided mode.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The two main components of an optical fiber are its core and cladding. The core is the inner axial portion of the optical fiber, which is where light transmission occurs in the optical fiber. The core typically has a diameter of about 8 µm. The cladding is a layer surrounding the core in which the core has a higher refractive index than that of the cladding. Also, the cladding typically has a diameter that is substantially larger than that of the core region, which can be around 125 µm. The present invention does not limit the size of the core and cladding to any particular size. The optical fiber may also include a coating layer surrounding the cladding.

Figure 1:
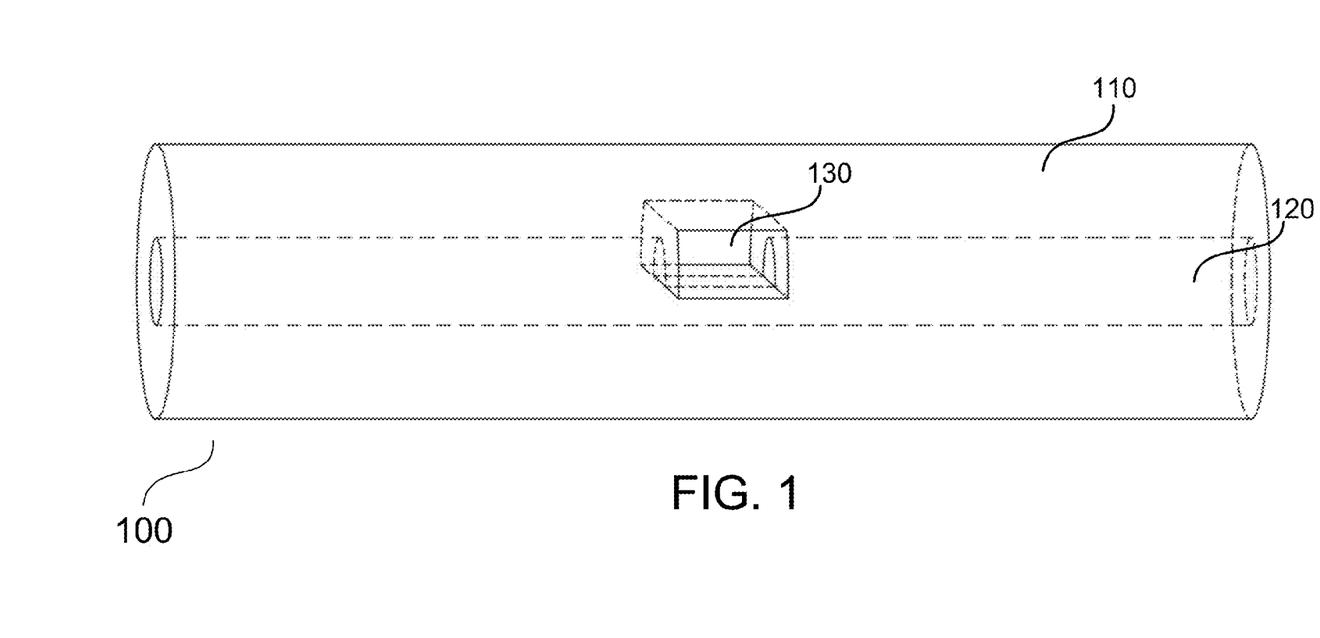
FIG. 1 illustrates the general schematic of a single fiber in-line MZI in accordance with an embodiment of the present invention.

FIG. 1 illustrates the schematic of a single fiber in-line MZI 100 in accordance with an embodiment of the present invention. The optical fiber 100 may be made with glass or polymer. The MZI is an optical fiber that includes a cladding 110, core region 120, a micro-cavity 130. Micro-cavity 130 is an open air cavity with a part of the cladding 110 and core region 120 perpendicularly removed.

Figure 2A:
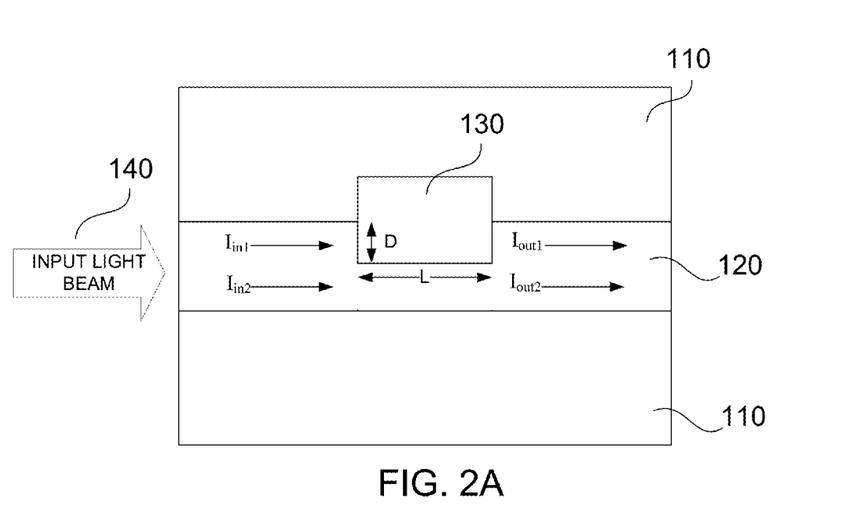
FIG. 2A shows a side view of a single fiber in-line MZI in accordance with an embodiment of the present invention.
Figure 2B:
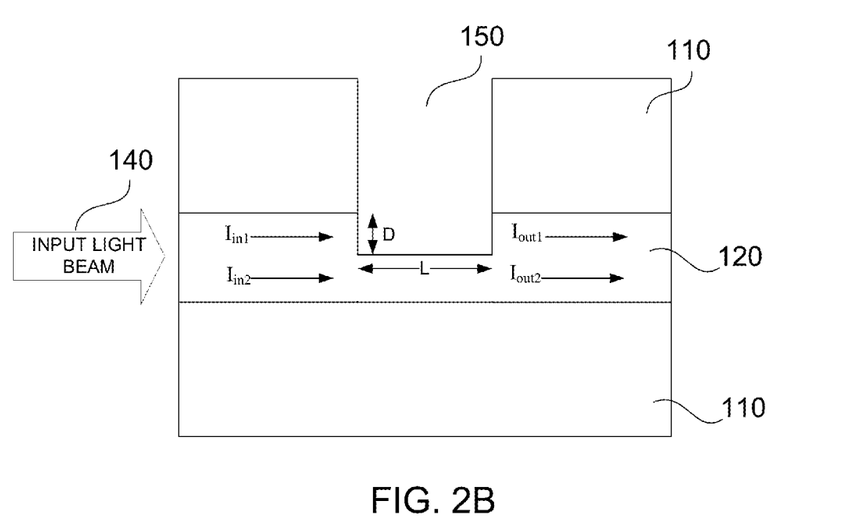
FIG. 2B shows a side view of a single fiber in-line MZI in accordance with another embodiment of the present invention.

According to one embodiment, the ablated micro-cavity 130 enables the phase difference between the guided mode and unguided mode through the micro-cavity. FIG. 2A shows a side view of a single fiber in-line MZI 100 in accordance with an embodiment of the present invention. In FIG. 2A, D represents the maximum distance of the removed fiber core and L represents the cavity length of micro-cavity 130. According to this embodiment, micro-cavity 130 is an openair cavity in the middle of the single fiber in-line MZI 100. FIG. 2B shows a side view of the single fiber in-line MZI 100 in accordance with another embodiment of the present invention in which micro-cavity 150 having the top portion (above the removed core region) of the cladding removed.

The input light beam 140 is split into two portions by micro-cavity 130, denoted as $I_{in1}$ and $I_{in2}$, respectively. Input light beam $I_{in2}$ propagates within fiber core 120, which is also known as a guided mode. Input light beam $I_{in1}$ propagates through the micro-cavity 130 and enters back into the fiber core 120, which is also known as an unguided mode. After the light beams $I_{in1}$ and $I_{in2}$ propagate through the micro-cavity and fiber core, output beams $I_{out1}$ and $I_{out2}$ recombines at the fiber core. In other words, the micro-cavity 130 performs the function of a beam splitter when the light beam enters micro-cavity 130, and performs the function of a beam combiner when the output beams $I_{out1}$ and $I_{out2}$ recombines at the fiber core.

Figure 6:
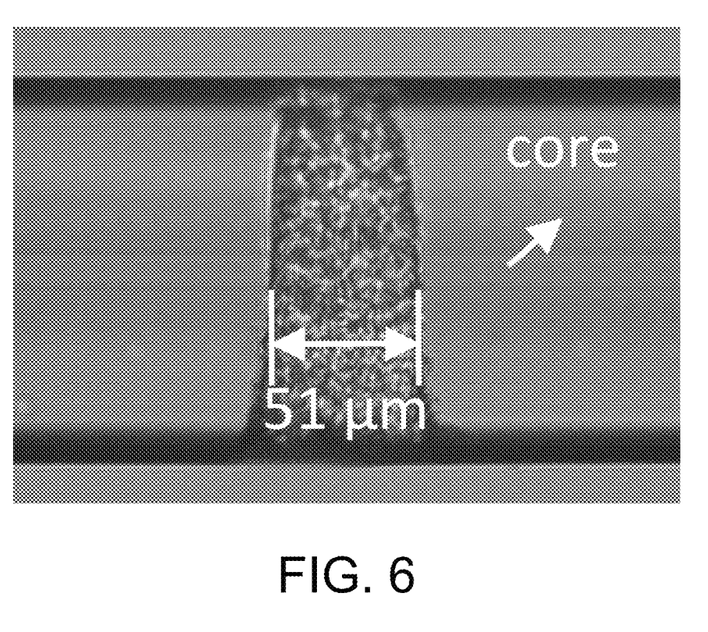
FIG. 6 shows a top view of the microscopic image of an MZI.

In one embodiment, the micro-cavity is created using femtosecond pulse ablation. Femtosecond laser pulses ($\lambda$=800 nm) of the duration of 120 fs and the repetition rate of 1 kHz were focused onto the fiber by a 10× objective lens with a numerical aperture (NA) value of 0.25 and a working distance of 7 mm. The on-target laser power is maintained at approximately 15 mW. The optical fiber may be a standard optical fiber such as SMF-28® (from Corning), with the core diameter of 8.2 µm and the nominal effective index of 1.4682 (@1550 nm). It can be mounted on a computer controlled X-Y-Z translation stage with 40-nm resolution. To monitor the transmission spectra in real-time, a broadband light source and an optical spectrum analyzer (OSA) with a resolution of 0.01 nm are used. The micro-cavity can be fabricated by femtosecond pulse ablation with a scanning speed of 20 µm/s along the fiber length. After each scanning cycle, the focal spot of the laser beam is moved closer to the fiber core with a step of 400 nm before the next cycle started, until the largest fringe visibility is obtained. After the processing is completed, the micro-cavity created can be washed with methanol or the like. FIG. 6 shows a top view of the microscopic image of an MZI with a cavity length (L) of about 51 µm.

Figure 3A:
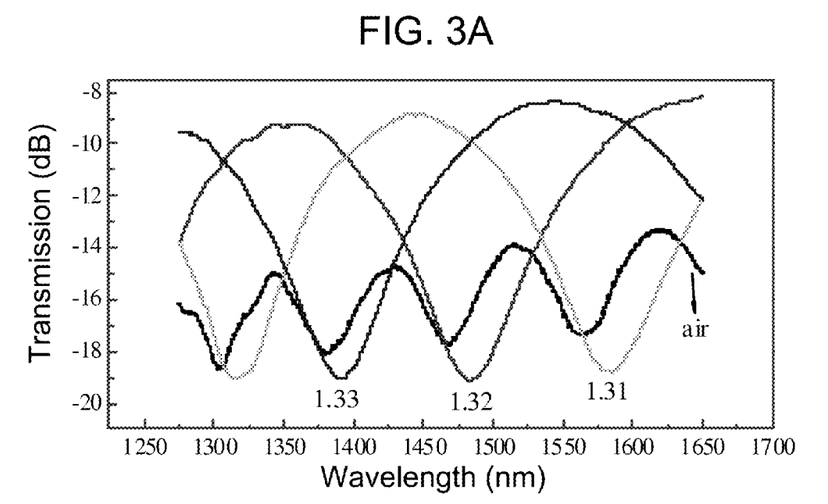
FIG. 3A is an exemplary output spectrum of an in-line fiber MZI with micro-cavity at room temperature.

An exemplary output spectrum of an in-line fiber MZI with micro-cavity at room temperature was recorded as shown in FIG. 3A, where a fringe visibility of about 4 dB can be observed. The insertion loss was mainly attributed to two reasons: (1) the scattering loss at the cavity border, where the surface roughness is on the order of a micron; (2) the loss of the unguided mode propagated in the cavity. Hence, by carefully controlling the laser processing power, the surface roughness of the cavity border can be controlled, and thus, the insertion loss can be decreased. The insertion loss of the device can also be decreased when immersed in the RI liquids, due to the RI change at the cavity surface, which reduced the scattering loss. The fringe visibility depends on three factors: (1) the size of the removed fiber core, i.e. D; (2) the loss of the unguided mode in the cavity; (3) the absorption of the cavity medium. D determines the relative intensity of $I_{in1}$ and $I_{in2}$, and the latter two factors decide the values of $I_{out1}$ and $I_{out2}$. The highest fringe visibility appears when $I_{out1}=I_{out2}$. It turns out that a MZI device with the highest fringe visibility in air exhibits a degraded fringe visibility in RI liquids due to the loss of the liquid-absorption and the unguided mode. This explains why the 51-µm cavity exhibits ~4 dB fringe visibility in air while ~9 dB in RI liquids.

Figure 3B:
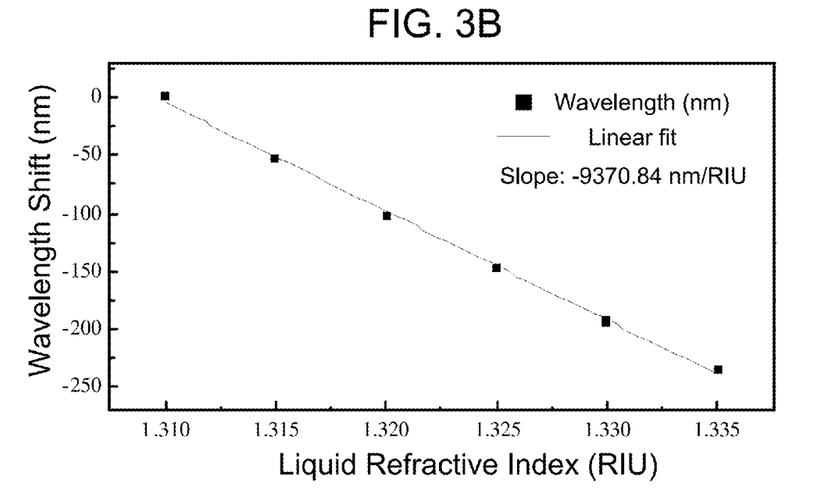
FIG. 3B is an exemplary graph of wavelength shift versus the RI filled in the micro-cavity.

To illustrates the system in response to the RI change, the in-line fiber MZI structure is immersed in a series of RI liquids (from Cargille Laboratories) in the RI range of 1.305-1.340 (@489.3 nm) with an interval of 0.005 and the transmission spectra recorded had a resolution of 0.1 nm. After each liquid sample is measured, the fiber MZI device is carefully rinsed with methanol until the original spectrum (i.e. the reference spectrum) could be restored and no residue liquid is remained inside the micro-cavity. The typical transmission spectra of the MZI device corresponding to the RI values of 1.31, 1.32 and 1.33 are plotted in FIG. 3A. The spectrum of 1.31 RI liquid exhibited two resonance wavelengths of 1314.87 and 1584.47 nm in the wavelength region of 1275-1650 nm and the free spectral range (FSR) can be determined as approximately 270 nm. The wavelength shift corresponding to different RI values between 1.31 and 1.335 are illustrated in FIG. 3B, where a linear fit of the experimental data is implemented and an extremely high sensitivity of −9370.84 nm/RIU is obtained. FIG. 3B illustrates that wavelength shift linearly corresponds with refractive index change, and hence, the present MZI is capable of accurately measuring refractive index.

Figure 4:
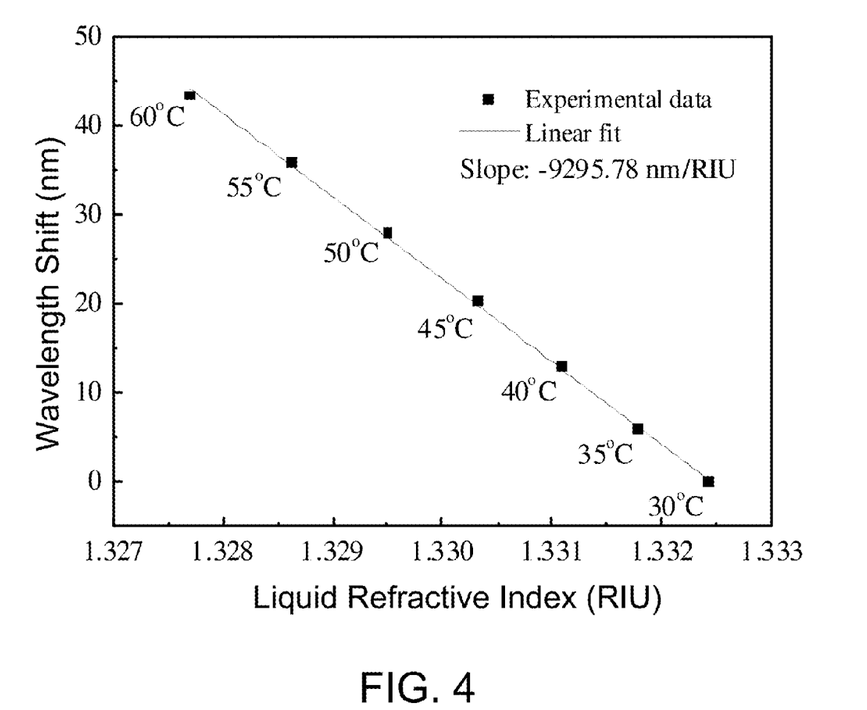
FIG. 4 is a graph illustrating wavelength shift of a MZI device versus RI change between 1.32770 and 1.33243, corresponding to the temperature variation from 60° C. to 30° C.

The linear response of the in-line single fiber MZI to the RI in a fine scale can also be illustrated by filling the cavity with water and varying its temperature. The temperature RI coefficient of the water is in the order of $10^{-4}$/° C., much larger than that of fused silica (typically in the order of $10^{-5}$/° C.). FIG. 4 is a graph illustrating wavelength shift of the MZI device versus the RI change between 1.32770 and 1.33243, corresponding to the temperature variation from 60° C. to 30° C. A total wavelength shift of about 43 nm can be observed, and the RI sensitivity obtained is −9295.78 nm/RIU, which is in good agreement with the results obtained previously.

The present MZI is based on the interference of a guided mode in the fiber core and an unguided mode that travels through the micro-cavity. The effective index difference between the two arms (i.e., guided mode and unguided mode) of the MZI is very large (>0.10), which allows a dramatic reduction of the cavity length while maintaining a high RI sensitivity. Moreover, the position of the RI change can be precisely located due to the small size of the micro-cavity. The FSR of the device is determined by the size of cavity length (L). When L is large, the FSR becomes small, which leads to a decreased measurement range. Because of the low reflectivity at the laser-ablated cavity surface, the multiple reflections of the cavity can be neglected, and thus the MZI device can be characterized by the well-known two-beam optical interference equation as:

$$I = I_{out1} + I_{out2} + 2\sqrt{I_{out1} I_{out2}} \cos\left(\frac{2\pi L \Delta n}{\lambda} + \phi_0\right) \quad (1)$$

where I represents the intensity of the interference signal, $\lambda$ is the wavelength, and $\phi_0$ is the initial phase of the interference. $\Delta n$ denotes the effective index difference, $\Delta n = n_{eff} - n_{cavity}$, where $n_{eff}$ and $n_{cavity}$ are the effective RI of the core and that of the cavity mode, respectively. According to Eq. (1), the interference signal reaches its minimum when the following condition is satisfied:

$$\frac{2\pi L \Delta n}{\lambda_m} + \phi_0 = (2m+1)\pi \quad (2)$$

where m is an integer and $\lambda_m$ is the central wavelength of the m-th order interference dip. Assuming that the cavity length is kept constant during the experiment, the sensitivity can be derived from Eq. (2) as:

$$\frac{d\lambda}{d(\Delta n)} = \frac{\lambda}{\Delta n} \quad (3)$$

From Eq. (3), the sensitivity of the present MZI can be calculated as 9924.1 nm/RIU at 1570 nm for $\Delta n$=1.4682−1.31=0.1582, which is close to the experimental results obtained.

The detection limit (DL) can be determined with a smallest detectable change in resonance wavelength (R) and the sensitivity (S) by DL=R/S. White and Fan, "On the performance quantification of resonant refractive index sensors", Opt. Express 16, 1020-1028 (2008), have given a heuristic formula to estimate DL taking into account the signal to noise ratio (SNR), full width at half-maximum (FWHM) of the resonance, thermal noise and the OSA resolution. In the present MZI device, R is dominated by the FWHM of the interference fringe, which is measured to be ~80 nm. Assuming a SNR of 50 dB, the detection limit was calculated to be 3.0×10−4 RIU.

According to another embodiment, the present MZI can be used for temperature sensing. The temperature sensitivity originates from the difference of the temperature coefficients of refractive index between the fiber core and air. The sensitivity achieved for a cavity length of ~47 μm is ~0.046 nm/° C., within the temperature range from 100 to 1100° C.

Assuming that the cavity length L keeps constant, the temperature sensitivity of the MZI could be derived from Eq. (1) as:

$$\frac{d\lambda}{dT} = \frac{\lambda}{n_{\text{eff}}^{\text{core}}(T) - n_{\text{eff}}^{\text{cavity}}(T)} \left( \frac{dn_{\text{eff}}^{\text{core}}(T)}{dT} - \frac{dn_{\text{eff}}^{\text{cavity}}(T)}{dT} \right) \quad (4)$$

where $n_{\text{eff}}^{\text{core}}$ and $n_{\text{eff}}^{\text{cavity}}$ are functions of temperature, and $$\frac{dn_{\text{eff}}^{\text{core}}(T)}{dT} \text{ and } \frac{dn_{\text{eff}}^{\text{cavity}}(T)}{dT}$$

are the temperature coefficients of refractive index of the fiber core and cavity medium, respectively.

To illustrates the temperature sensitivity, the MZI with L=47 μm is placed into a high temperature furnace for temperature measurement. An interference dip around 1551 nm at the room temperature is monitored during the experiment as it has the largest free spectral range (FSR) in the wavelength region of 1500-1600 nm. The fiber device is first heated to 1000° C. and maintained there for 2 hours to remove the burnt fiber coating induced effects. As a result, the interference dip is shifted to the shorter wavelength for about 3 nm compared to the original spectrum after the device cooled down to room temperature. Then, the temperature was gradually increased to 100° C., and then to 1100° C. with a step increment of 100° C., and stayed for 30 minutes at each step. The device is kept at 1100° C. for two hours before being cooled down to 100° C. and then to the room temperature, following the same step and staying time as in the heating process. The dip wavelength and the transmission spectra were recorded in both the heating and the cooling processes. There are only slight deviations (<0.2 nm) of the dip wavelength in the cooling process when compared to that in the heating process.

Figure 5A:
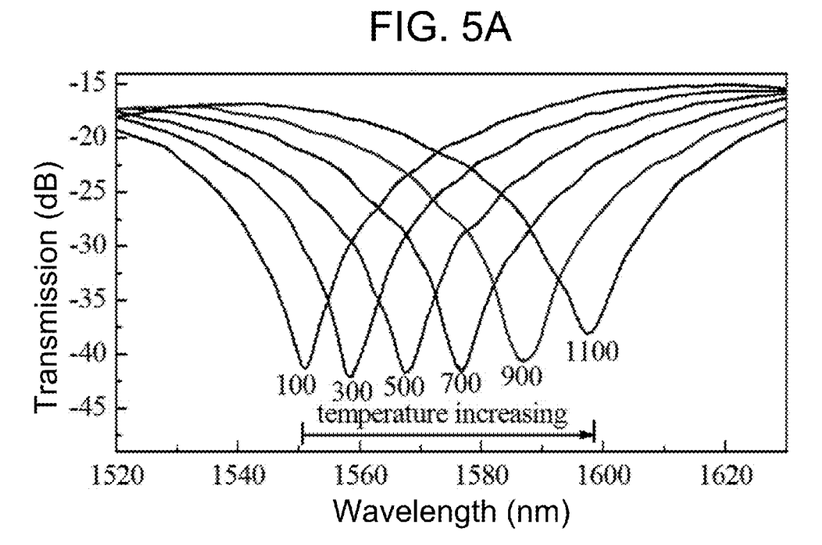
FIG. 5A illustrates a transmission spectra at a number of temperature points.
Figure 5B:
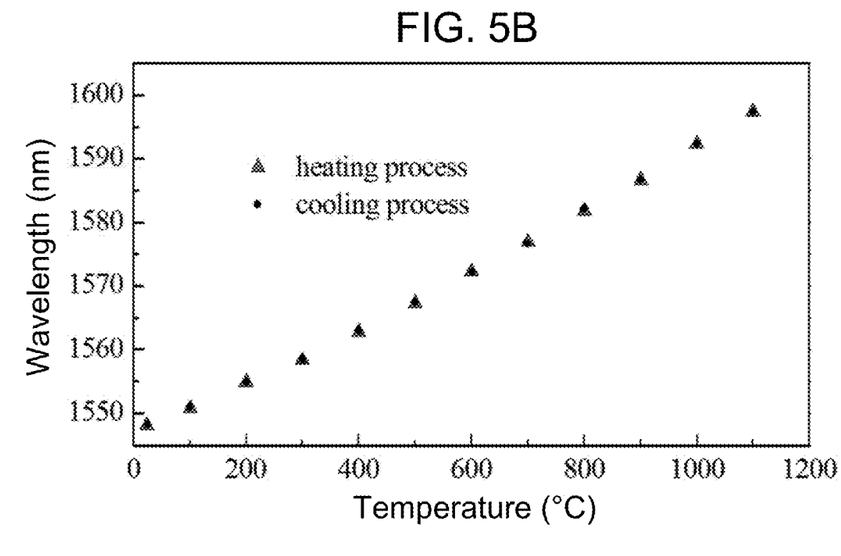
FIG. 5B is a graph illustrating the variation of dip wavelength with temperature change.

FIG. 5A shows the transmission spectra at a number of temperature points. It can be clearly seen from the figure that the dip shifts toward the longer wavelength with increased temperature. FIG. 5B is a graph illustrating the variation of dip wavelength with temperature change, the results show good repeatability for the heating and cooling processes and a sensitivity of approximately 0.046 nm/° C. can be obtained. The resolution could be estimated to be approximately 0.22° C. with the OSA resolution of 0.01 nm.

As shown in Eq. (4), the sensitivity of the MZI is only dependent on the wavelength, $$\frac{dn_{\text{eff}}^{\text{core}}(T)}{dT} \text{ and } \frac{dn_{\text{eff}}^{\text{cavity}}(T)}{dT},$$

and independent of the cavity length. This implies that the sensitivity is essentially a constant as long as the inspected wavelength remains the same. Taking the refractive index values of fused silica and air, 1.4682 and 1.0000, $n_{\text{eff}}^{\text{core}}$ and $n_{\text{eff}}^{\text{cavity}}$, respectively, and the temperature coefficients of the corresponding refractive index, index, $$\frac{dn_{\text{eff}}^{\text{core}}(T)}{dT} \text{ and } \frac{dn_{\text{eff}}^{\text{cavity}}(T)}{dT},$$

be 13×10−6 RIU/° C. (refractive index unit) and 0 RIU/° C., respectively, the sensitivity can be calculated as about 0.045 nm/° C. at the wavelength of 1600 nm. Such a theoretical result is in good agreement with that obtained in the experiment. Therefore, the present MZI is suitable for temperature sensing, even at an extremely high temperature.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

What is claimed is:

1. A single fiber Mach-Zehnder interferometer comprising:
   an optical fiber having a core region and a cladding surrounding the core region; and
   a micro-cavity having part of the cladding and the core region removed, the micro-cavity is directly exposed to external environment,
   wherein the micro-cavity is adapted to receive a light beam and separate the light beam into a first light beam that propagates through the micro-cavity in an unguided mode, and a second light beam that propagates through the core region in a guided mode.

2. The single fiber Mach-Zehnder interferometer according to claim 1, wherein the micro-cavity is created by using femtosecond laser pulse irradiation.

3. The single fiber Mach-Zehnder interferometer according to claim 1, further comprises a sample that is inserted into the micro-cavity.

4. The single fiber Mach-Zehnder interferometer according to claim 3, wherein refractive index of the sample can be measured based on wavelength shift in a transmission spectrum.

5. The single fiber Mach-Zehnder interferometer according to claim 1, wherein temperature can be measured based on wavelength shift in a transmission spectrum.

6. The single fiber Mach-Zehnder interferometer according to claim 1, wherein the micro-cavity having a cavity length L and a removed core region distance D.

7. A method of making a single fiber Mach-Zehnder interferometer using an optical fiber having a core region and a cladding surrounding the core region, the method comprising:
   creating a micro-cavity on the optical fiber with part of the cladding and the core region removed, the micro-cavity is directly exposed to external environment, wherein the micro-cavity is adapted to receive a light beam and separate the light beam into a first light beam that propagates through the micro-cavity in an unguided mode, and a second light beam that propagates through the core region in a guided mode.

8. The method of making a single fiber Mach-Zehnder interferometer according to claim 7, wherein the micro-cavity is created by using femtosecond laser pulse irradiation.

9. The method of making a single fiber Mach-Zehnder interferometer according to claim 7, wherein the micro-cavity having a cavity length L and a removed core region distance D.

\* \* \* \* \*